(12) United States Patent
Kelleher et al.

(10) Patent No.: US 12,016,350 B2
(45) Date of Patent: *Jun. 25, 2024

(54) PROCESS FOR ISOLATING A PROTEIN COMPOSITION AND A FAT COMPOSITION FROM DEBONED POULTRY

(71) Applicant: KEMIN PROTEINS LLC, Des Moines, IA (US)

(72) Inventors: Stephen D. Kelleher, Ipswich, MA (US); William R. Fielding, Hilton Head, SC (US); Wayne S. Saunders, Port Charlotte, FL (US)

(73) Assignee: KEMIN PROTEINS LLC, Des Moines, IA (US)

( * ) Notice: Subject to any disclaimer, the term of this patent is extended or adjusted under 35 U.S.C. 154(b) by 429 days.

This patent is subject to a terminal disclaimer.

(21) Appl. No.: 16/781,116

(22) Filed: Feb. 4, 2020

(65) Prior Publication Data

US 2020/0170275 A1    Jun. 4, 2020

Related U.S. Application Data

(63) Continuation-in-part of application No. 15/855,546, filed on Dec. 27, 2017, now abandoned, which is a
(Continued)

(51) Int. Cl.
*A23J 1/02* (2006.01)
*A23D 9/04* (2006.01)
(Continued)

(52) U.S. Cl.
CPC ............... *A23J 1/02* (2013.01); *A23D 9/04* (2013.01); *A23L 13/52* (2016.08); *C11B 1/02* (2013.01);
(Continued)

(58) Field of Classification Search
CPC ........................................................ A23J 1/02
See application file for complete search history.

(56) References Cited

U.S. PATENT DOCUMENTS 5,384,149 A    1/1995 Lin
5,871,795 A    2/1999 Roth
(Continued)

FOREIGN PATENT DOCUMENTS

CA    2522824    11/2004
EP    0848911    1/2004
(Continued)

OTHER PUBLICATIONS

Fischer, J., Drying in Vacuum Tumblers, Industrial and Engineering Chemistry, vol. 55, No. 2, Feb. 1963, pp. 18-24. (Year: 1963).*
(Continued)

*Primary Examiner* — Elizabeth Gwartney
(74) *Attorney, Agent, or Firm* — NYEMASTER GOODE P.C.

(57) ABSTRACT

A protein fraction and an oxidation stable fat fraction are recovered from poultry containing fat, bone and protein. The poultry is comminuted, solubilized with a food grade acid or base to form a liquid protein fraction and a solid fat fraction. The protein in liquid fraction is precipitated and the protein product retains the color of raw meat.

22 Claims, 2 Drawing Sheets

Related U.S. Application Data continuation of application No. 15/472,774, filed on Mar. 29, 2017, now abandoned, application No. 16/781,116 is a continuation-in-part of application No. 15/217,984, filed on Jul. 23, 2016, now abandoned, which is a continuation of application No. 14/872,279, filed on Oct. 1, 2015, now Pat. No. 10,010,097, said application No. 15/472,774 is a continuation-in-part of application No. 13/374,398, filed on Dec. 28, 2011, now abandoned, said application No. 14/872,279 is a continuation of application No. 13/374,077, filed on Dec. 12, 2011, now Pat. No. 9,161,555.

(60) Provisional application No. 62/800,754, filed on Feb. 4, 2019, provisional application No. 61/460,324, filed on Jan. 3, 2011.

(51) Int. Cl.
| | |
|---|---|
| *A23L 13/50* | (2016.01) |
| *C11B 1/02* | (2006.01) |
| *C11B 1/10* | (2006.01) |
| *C11B 3/04* | (2006.01) |
| *C11B 3/06* | (2006.01) |
| *C11B 3/16* | (2006.01) |
| *C11B 13/00* | (2006.01) |

(52) U.S. Cl.
CPC ............... *C11B 1/10* (2013.01); *C11B 3/04* (2013.01); *C11B 3/06* (2013.01); *C11B 3/16* (2013.01); *C11B 13/00* (2013.01); *A23V 2002/00* (2013.01)

(56) References Cited

U.S. PATENT DOCUMENTS

| | | | |
|---|---|---|---|
| 6,005,073 | A | 12/1999 | Hultin et al. |
| 6,136,959 | A | 10/2000 | Hultin et al. |
| 6,288,216 | B1 | 9/2001 | Hultin et al. |
| 6,451,975 | B1 | 9/2002 | Hultin et al. |
| 6,855,364 | B2 | 2/2005 | Kelleher et al. |
| 6,949,265 | B1 | 9/2005 | Schaefer |
| 7,163,707 | B2 | 1/2007 | Kelleher et al. |
| 7,473,764 | B2 | 1/2009 | Hultin et al. |
| 7,556,835 | B2 | 7/2009 | Hultin et al. |
| 7,666,456 | B2 | 2/2010 | Garwood |
| 7,763,717 | B1 | 7/2010 | Jaczynski |
| 7,956,081 | B2 | 6/2011 | Kelleher |
| 9,161,555 | B2 | 10/2015 | Kelleher et al. |
| 2004/0224079 | A1 | 11/2004 | Kelleher |
| 2005/0233060 | A1 | 10/2005 | Kelleher |
| 2009/0269440 | A1 | 10/2009 | Hardin |
| 2010/0009048 | A1 | 1/2010 | Hultin |
| 2011/0244093 | A1 | 10/2011 | Kelleher et al. |
| 2012/0171345 | A1 | 7/2012 | Kelleher |

FOREIGN PATENT DOCUMENTS

| | | |
|---|---|---|
| RU | 2 253 288 C2 | 9/2001 |
| WO | WO1999/011656 | 3/1999 |
| WO | WO2002020720 A2 | 3/2002 |
| WO | WO 2002/065848 | 8/2002 |
| WO | WO2010/136894 | 12/2010 |
| WO | WO 2012/093988 | 7/2012 |

OTHER PUBLICATIONS

J. M., James et al., "Application of Acid Solubilization Isoelectric Precipitation to Recover Protein from Low Value Red Meat," Animal Science Research Reports, Department of Animal Science, Oklahoma State University, p. 1-5 (2003).

Dawson et al., "Extraction of Lipid and Pigment Components from Mechanically Deboned Chicken Meat" J. Food Sci., vol. 53, No. 2, 1988, pp. 1615-1617.

International Search Report and Written Opinion from PCTIUS2014/059226.

International Search Report and Written Opinion from PCTIUS2012/071572.

International Search Report and Written Opinion from PCTIUS2017/043085, mailed Oct. 19, 2017.

International Search Report and Written Opinion from PCTIUS2011/01981, mailed Apr. 23, 2012.

Richard D. O'Brien: "Sanitation and Safety for a Fats and Oils Processing Plant"; "Chapter 199", In: Yiu H. Hui: "Handbook of Food Science, Technology, and Engineering, vol. 4", CRC Taylor & Francis, vol. 4, pp. 199-1-199-10 (2006).

Communication pursuant to Article 94(3) EPC,EP Application No. 11854716.5, Nov. 17, 2016.

Communication pursuant to Article 94(3) EPC,EP Application No. 11854716.5, Jan. 18, 2018.

Yasosky et al. , "Effects of pH and Time of Grinding on Lipid Oxidation of Fresh Ground Pork"—Journal of Food Science, vol. 49:1510-1512. (1984).

Extended Search Report, EP Application No. 16161447.4, Jun. 15, 2016.

International Preliminary Report on Patentability from PCT/US2017/043085, mailed Feb. 7, 2019.

Earl, Martin Heat and Its Effects on Muscle Fibers in Meat https://blog.thermoworks.com/beef/coming-heat-effects-muscle-fibers-meat/ Downloaded Oct. 13, 2019.

* cited by examiner

PROCESS FOR ISOLATING A PROTEIN COMPOSITION AND A FAT COMPOSITION FROM DEBONED POULTRY

REFERENCE TO RELATED APPLICATIONS

This application claims the benefit of U.S. Provisional Application No. 62/800,754, filed Feb. 4, 2019, entitled "Process For Isolating A Protein Composition And A Fat Composition From Deboned Poultry" by Stephen D. Kelleher, et al, and this application is a Continuation In Part of U.S. application Ser. No. 15/855,546, filed Dec. 27, 2017, entitled "Process for isolating a protein composition and a fat composition from mechanically deboned poultry" by Stephen D. Kelleher, et al; which is a continuation of U.S. application Ser. No. 15/472,774, filed Mar. 29, 2017, entitled "Process for isolating a protein composition and a fat composition from mechanically deboned poultry" by Stephen D. Kelleher, et al; which is a continuation in part of U.S. application Ser. No. 13/374,398, entitled, "Process for isolating a protein composition and a fat composition from mechanically deboned poultry" by Stephen D. Kelleher, et al., filed Dec. 28, 2011, which claims the benefit of U.S. Provisional Application No. 61/460,324, entitled, "Process for isolating a protein composition and a fat composition from meat trimmings" by Stephen Kelleher et al., filed Jan. 3, 2011; and this application is a Continuation In Part of U.S. application Ser. No. 15/217,984, filed Jul. 23, 2016, entitled "A Process for Obtaining Lean Protein" by Stephen D. Kelleher, et al, which is a Continuation of U.S. application Ser. No. 14/872,279, filed Oct. 1, 2015, entitled "Protein Composition Obtained From Meat Trimmings" by Stephen D. Kelleher, et al, which is a Continuation of U.S. application Ser. No. 13/374,077, filed Dec. 12, 2011, entitled "Process for isolating a protein composition and a fat composition from meat trimmings" by Stephen D. Kelleher, et al, which claims the benefit of U.S. Provisional Application No. 61/460,324, entitled "Process for isolating a protein composition and a fat composition from meat trimmings" by Stephen Kelleher et al., filed Jan. 3, 2011. The entire teachings of the above applications are incorporated herein by reference.

FIELD OF THE INVENTION

This invention relates to a process for isolating a protein composition and a stable fat composition from a fatty composition comprising deboned poultry (e.g., manually or mechanically deboned poultry) containing animal muscle tissue. More particularly, this invention relates to a process wherein the animal muscle tissue is solubilized in an acid or base, and the solubilized liquid protein composition so obtained is separated from solid animal fat and impurities under conditions (a) to reduce calcium content (b) to reduce sodium concentrations (c) to reduce oxidation and/or (d) to retain its functional properties including color (e.g., its raw meat color or red color).

DESCRIPTION OF PRIOR ART

At the present time, protein recovered from animal muscle tissue is obtained by solubilizing the animal muscle tissue in an edible acidic composition such as citric acid, hydrochloric acid or mixtures thereof. Such processes are disclosed in U.S. Pat. Nos. 6,005,073; 6,288,216; 6,451,975 and 7,473,364. While these processes are well adapted for recovering protein from animal muscle tissue, they may have shortcomings when protein is extracted from starting material high in bone concentration. Chief among these are the potentially high amounts of calcium, originally found in the intrinsic bone material, that ends up in the final meat product. The final meat product contains bone and may or may not be mechanically deboned to separate the majority of the bone from the meat. These bone containing meats contain a high concentration of animal muscle tissue, typically between 65-85% by weight with the remaining composition comprising primarily fat and bone. Mechanically deboned poultry may also contain high amounts of blood, a component that contributes hemoglobin and its constituent iron/heme molecules to the mix. It has been found that microgram levels of heme pigment were found to be a controlling factor in the oxidation of fish muscle. Thus, it is desirable to recover the protein from the animal muscle tissue for use as a food additive rather than discarding it. It is also desirable to recover purified and stabilized fat from poultry containing bone such as mechanically deboned poultry which has economic value as a food additive.

A need exists for improved methods and composition for processing deboned poultry.

SUMMARY OF THE INVENTION

The present invention processes deboned poultry (e.g., manually or mechanically deboned) derived muscle tissue in a manner which retains functionality of the recovered protein product. Protein functionalities of most concern to food scientists are color, solubility, water holding capacity, gelation, foam stability and emulsification properties.

Additionally, the process of the present invention processes animal tissue in a manner which results in a final product that has large fibers, which produces better yield and has better final product texture.

In an embodiment, the present invention also provides a process for producing a fat fraction having a relatively low concentration of water and which is stable against oxidation. Such a form of fat permits its addition to a variety of food products.

The U.S. government provides that a certain quality of meat product obtained from animal trimmings can be used undeclared in meat products of the same species. For example, "finely textured beef" and "lean finely textured beef" can be used in ground beef without being declared on the label. The inventive protein composition, in an embodiment, is "Finely textured meat" (FTM) which has a fat content of less than 30%; a protein content of 14% or greater, by weight; a protein efficiency ratio (PER) of 2.5 or higher, or an essential amino acids (EAA) content of 33% of the total amino acids or higher. The present invention also results, in an embodiment, in "Lean finely textured meat" (LFTM) which has a fat content of less than 10%, by weight, and complies with the other requirements of "finely textured meat".

Accordingly, the present invention provides a process for isolating animal muscle protein from fatty animal tissue containing animal muscle tissue such as from poultry containing bone including mechanically deboned poultry and provides high yields of functional animal muscle protein while significantly destroying microorganisms. Furthermore, in an embodiment, the present invention also provides a fat product from poultry meat containing bone such as deboned poultry which is stable against oxidation and which has a relatively low concentration of water. Also, present invention provides an animal muscle protein product that has similar or reduced sodium content as compared to the original meat. In addition, present invention provides such a process which eliminates undesirable smell characteristics such as the smell of ammonia. Furthermore, the present invention produces a final meat product that has large fibers which results in a more desirable ground meat-like texture and mouth feel. Such a process would provide high recovery rates of fat that is stable against oxidation and of animal muscle protein in a low microorganism environment while avoiding the addition and retention of ingredients which adversely affect edibility of the protein product.

In accordance with this invention, a process is provided for isolating both animal muscle protein having a retained functional raw meat color (e.g., a "red" color or "reddish" color) and fat stabilized against oxidation. The protein product is obtained from poultry containing bone such as mechanically/manually deboned poultry having animal muscle tissue and fat. The process provides high yields of functional animal muscle protein having retained and functional color (the color of raw meat) while avoiding problems due to the presence of microorganisms and avoiding problems which render the recovered proteins inedible. The process of this invention also provides a fat product which is stable against oxidation and which contains a relatively low water concentration. The process of this invention produces an animal tissue product that meets the definition of "finely textured meat" or "lean finely textured meat" as defined by the U.S. government for beef and as extended to poultry.

The process of this invention includes the process steps of comminuting fresh or frozen poultry containing bone such as manually deboned poultry or mechanically deboned poultry, adding cold potable water to the comminuted poultry; optionally simultaneously adding a food grade acid or food grade base; homogenizing the comminuted poultry-water mixture; adding a food grade acid or base to the homogenized mixture to solubilize the protein. In the case of an acid, the pH of the homogenized mixture is lowered so that the pH of the resultant mixture is between about 3.6 to about 4.4 (e.g., about 3.6, 3.7, 3.8, 3.9, 4.0, 4.1, 4.2, 4.3, 4.4), preferably between about 3.6 and about 3.8 to solubilize the animal muscle tissue. In the case of a base, the pH of the homogenized mixture is raised so that the pH of the resultant mixture is between about 8.3 and about 10.5 (e.g., about 8.4, 8.5, 8.6, 8.7, 8.9, 9.0, 9.1, 9.2, 9.3, 9.4, 9.5, 9.6, 9.7, 9.8, 9.9, 10.0, 10.1, 10.2, 10.3, 10.4). Put another way, the step can refer to adjusting the pH of the comminuted poultry to solubilize the protein to obtain a solubilized liquid protein solution, wherein said pH adjustment for solubilizing the protein includes the addition of a food grade acid to obtain a pH value in the range between about 3.6 and about 4.4 or the addition of a food grade base to obtain a pH value in the range between about 8.3 and about 10.5, to thereby obtain a solubilized liquid protein solution. In this step, the calcium remains insoluble. The inventive method includes separating the solid fat from the solubilized (acidic or basic) solution of animal muscle protein, and recovering the solid fat. In this step, the calcium is separated together with the solid fat from the solubilized protein to thereby obtain a reduced fat solubilized liquid protein solution. The inventive process further includes optionally evaporating water from the solubilized solution of animal muscle protein to form a concentrated protein solution, and recovering the solution of animal muscle protein. The method further includes precipitating the protein in the reduced fat solubilized liquid protein solution by adding a food grade alkaline composition (if acid was used to solubilize) or by adding a food grade acid composition (if base was used to solubilize) to the animal muscle protein solution to bring the pH to between about 4.9 and about 6.4, (e.g., 4.9, 5.0, 5.1, 5.2, 5.3, 5.4, 5.5, 5.6, 5.7, 5.8, 5.9, 6.0, 6.1, 6.2, 6.3, 6.4) preferably between about 5.2 and about 5.8 to form a salt from the reaction of the acid with the alkaline composition and to precipitate the protein. During precipitation, the sodium remains soluble. The process can further include separating the solid protein from the remaining liquid such as by centrifugation and/or screen filtration and optionally freezing the precipitated animal muscle protein composition. The inventive protein composition, after undergoing the process, has 14% or greater by weight protein and less than 10% by weight fat, wherein the less than 10% by weight fat is stabilized against oxidation.

It has been found that when reducing the pH of animal muscle tissue from 3.6 to 4.4 or increasing the pH to 8.3 to 10.5 in accordance with this invention, the animal muscle tissue is solubilized while retaining essentially its original color (functional raw meat red/reddish color) and that satisfactory yields of muscle tissue (protein) are obtained. For beef, the animal muscle tissue protein product has a color of 75 to 52 L*, 25 to 15 a* and 23 to 16 b* wherein L*, a* and b* are defined according to the Commission Internationale de l'eclairage (CIE) as L* (luminance or muscle lightness), a* (redness or muscle redness), b* (yellowness or muscle yellowness). For poultry, the animal muscle tissue protein product has a color of 82 to 45 L*, 7.5 to 2.2 a* and 20 to 3 b*. For example, in the case of beef and poultry muscle tissue, the original color is essentially retained. In contrast, when the pH is about 3.5 or less, the tissue color becomes brown and does not revert to its original color. A protein composition having a "brown" color is not suitable for addition to a food having a "raw" meat color. The present invention allows for processing of animal muscle tissue and retains color of its original raw meat. It has also been found that solubilization of the animal muscle tissue results in a significant reduction of viable microorganisms (e.g., when utilizing food grade hydrochloric acid or sodium bicarbonate). In an embodiment, one food grade acid and base combination of interest in this present invention is citric acid to lower the pH and sodium bicarbonate to raise the pH. It has also been found that mixing the fat with food grade acid or base in accordance with this invention stabilizes the fat against oxidation. In addition, in an embodiment, it has been found that when mixing the fat containing acid with a food grade base to a pH between about 4.9 and about 5.8 effects separation of water from the fat from about 70 to about 50 weight % down to a water content between about 30 and about 20 weight percent. This result simplifies subsequent water removal from the fat if such additional water removal is desired.

DETAILED DESCRIPTION OF SPECIFIC EMBODIMENTS

Figure 1:
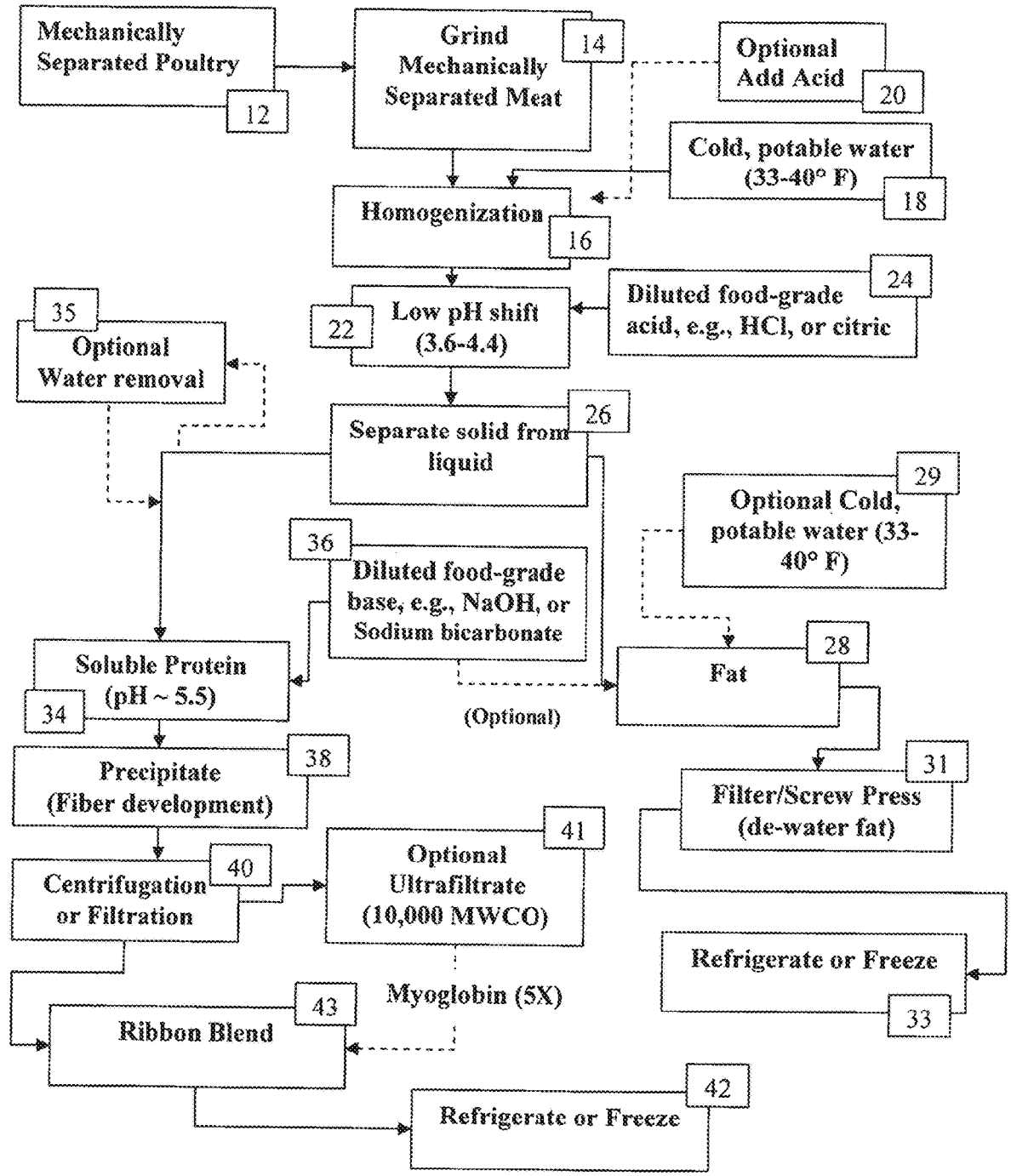
FIG. 1 is a process flow diagram of the process of this invention using acid to solubilize the protein.

The present invention relates to a method for processing animal trimmings to recover a meat product that retains its raw meat, functional color, and is low in fat content, high in protein and essential amino acid content, and a stabilized fat product. "Meat product" describes a protein-containing product which is suitable for human consumption as meat because it contains a certain amount of protein. Generally, "deboned poultry" refers to the tissue separated from poultry containing fat and bone. "Mechanically deboned poultry" refers to separation of the same during butchering operations. The conventional poultry cuts or parts are generally sold directly to consumers or further processed such as grinding into ground poultry. The tissue remaining after the conventional cuts are removed generally has a fat content which is too high for human consumption as meat, but contains proteins which can be recovered.

According to the present invention, once the poultry pieces containing bone such as deboned poultry are removed from the carcasses, they are forwarded directly to the process of the present invention. Alternatively, the recovered poultry can be frozen or cooled and stored prior to processing. The temperature of the recovered poultry upon removal from the carcasses is usually about 33-40° F., which corresponds to the temperature at which the carcasses are stored prior to butchering. Warmer or cooler trimmings can be used in the process of the present invention.

The poultry containing bone processed by the present invention can include all the parts normally found in an animal, including adipose tissue, fat, lean ligaments, tendons, bone parts, and the like. It is generally desirable that if components other than fat, lean, and moisture are present, they are present in small quantities and/or can be removed in the desinewing step or by hand, if desired, or can be left therein if their presence does not adversely affect the properties of the poultry meat product. If large amounts of certain components are present, it may be desirable to have them removed by conventional separation techniques prior to processing according to the present invention. For example, it is generally desirable not to have large amounts of bone present or large amounts of low quality ligaments.

"Meat producing animals" includes animals which are known to provide meat. Such animals include beef, pork, poultry such as chicken or turkey, e.g. deboned chicken, and the like. The lean material can be referred to as protein-containing material, and can be in the form of water soluble protein which include muscle fiber, and non-water soluble protein which are generally the myofibrillar or locomotion proteins or the connective tissue which surrounds muscle fiber and which attach the muscle fibers to ligaments. Of particular interest for purposes of the present invention is the presence of the water-soluble protein and the acid/base soluble protein from the animal muscle tissue in the fatty tissue within the fat trimmings. By separating this protein material from the animal trimmings, a high-quality meat product can be provided. This product can be utilized as an additive to conventional meat products such as hamburger.

Poultry containing meat, fat and bone, which can be used in the present invention preferably, have an average fat content of between about 5 and 50% by weight (e.g., 5, 10, 15, 20, 25, 30, 35, 40, 45, or 50%), preferably between about 10 and 30% by weight. The lean content of the poultry containing bone is preferably between about 65% and 85% by weight (e.g., 65, 70, 75, 80, or 85%), and more preferably between about 75 and 85% by weight. The lean content includes protein and moisture. The resulting product, after undergoing the steps of the present invention, in an embodiment, is "Finely textured meat" (FTM) has a fat content of less than 30%; a protein content of 14% or greater by weight; a protein efficiency ratio (PER) of 2.5 or higher, or an essential amino acids (EAA) content of 33% of the total amino acids or higher. The present invention also results, in an embodiment, in "Lean finely textured meat" (LFTM) which has a fat content of less than 10% by weight, and complies with the other requirements of "finely textured meat".

Figure 2:
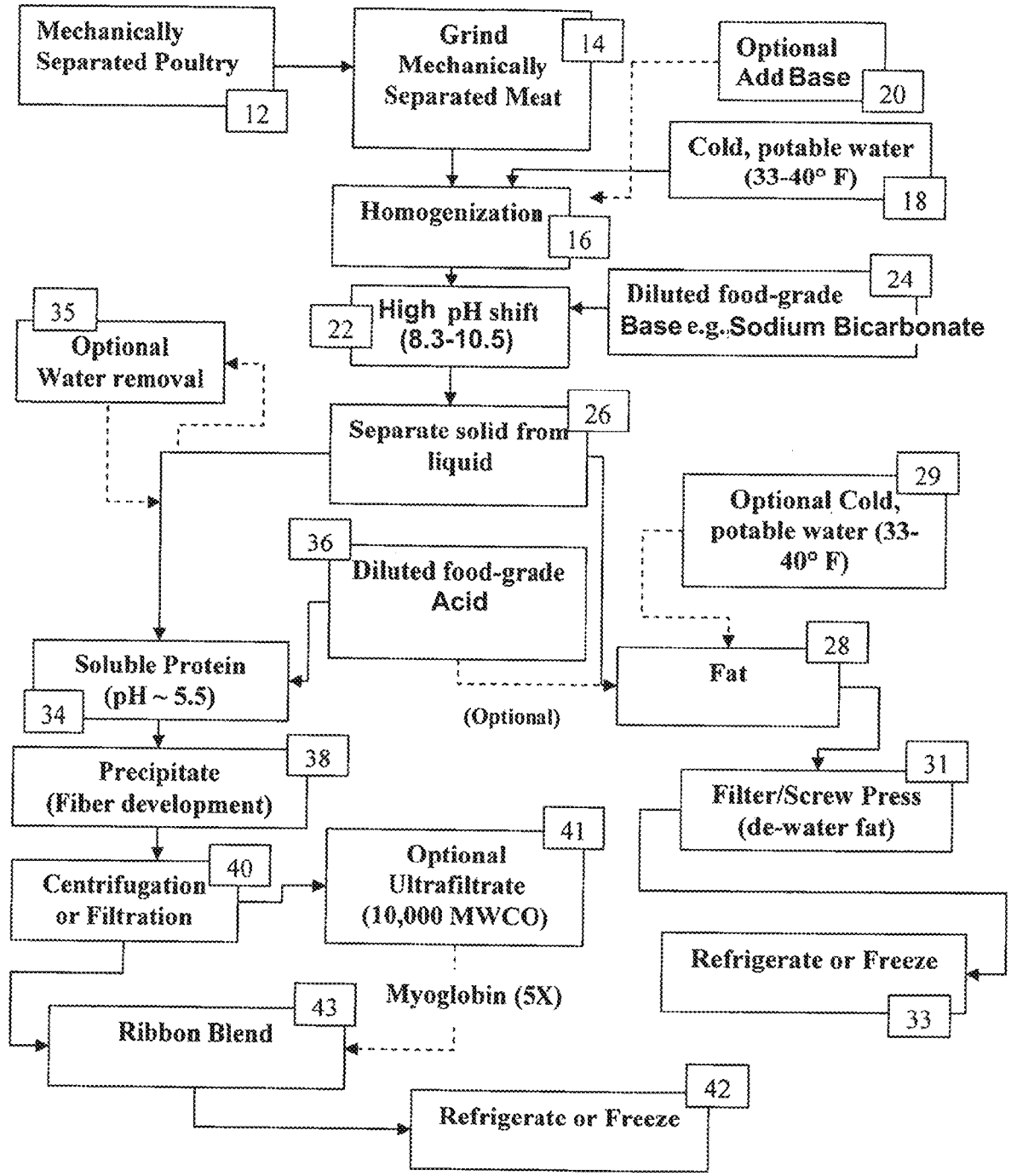
FIG. 2 is a process flow diagram of the process of this invention using base to solubilize the protein.

Referring to FIGS. 1 and 2 which illustrate embodiments of this invention, a feed 12 such as mechanically deboned or separated poultry containing about 50% by weight muscle tissue and about 50% by weight fat, mechanically separated chicken or the like are directed to a comminution step 14 which increases the surface area of the poultry rendering it more suitable for further processing. Suitable comminution apparatus includes meat grinders available from Weiler and Company Corporation located in Whitewater, WI or Carnitec USA, Inc, located in Seattle, WA The starting poultry is first ground to a size that enables it to be put through a micro-cutter. It is preferable to coarse cut ¼ inch, followed by a ⅛ inch grind. Some mechanically deboned meat may not need to be pre-ground because it is already at the appropriate particle size. Once ground, the material is mixed with water (33-40° F.) at a ratio of one part ground meat to approximately 5-6 parts water. This amount of water can vary and can go as high as approximately 1 part ground meat to 10 parts cold water. The addition of water lowers the ionic strength of the homogenate which is required for complete solubilization of the proteins. Optionally, acid (FIG. 1) or base (FIG. 2) can be added to the poultry in step 20 to improve protein solubilization. The comminuted poultry is directed to homogenization step 16 where it is mixed with potable water 18 at a water temperature typically between about 33° F. and about 40° F. and homogenized, typically to an average particle size of about 0.5 to about 4 millimeters preferably between about 1 to about 2 millimeters. A preference has been shown for a micro-cut with a 0.035 mm cutting head size. Representative suitable homogenizers for this purpose include emulsifiers or micro-cutters, available from Stephan Machinery Corporation, located in Columbus, OH or high-shear mixers available from Silverson, located in East Longmeadow, MA or the like.

In a step to control microorganisms, the temperature of the homogenate is kept cold throughout the process (33-40° F.). The cold temperature is most effective for separating the fat from the protein. This unit operation is accomplished while the pH is still near the pH of the initial muscle. An alternative is to add enough food-grade acid (FIG. 1) or base (FIG. 2) to bring the composite pH to the isoelectric point. Typically, the isoelectric point is about pH 5.5, but it can vary from species to species. At the isoelectric point, proteins are least able to form emulsions with lipid molecules, and, therefore, more lipid renders away from the proteins during the extraction process. Once the tissue is homogenized, it is ready to be adjusted to a low pH.

Referring to FIG. 1, the resultant homogenate is directed to step 22 wherein it is mixed with a food grade acid 24 such as dilute hydrochloric acid, dilute phosphoric acid, dilute citric acid, ascorbic acid, tartaric acid or mixtures thereof or the like in order to reduce the pH of the homogenate to between pH 3.6 and pH 4.4 (e.g., 3.6, 3.7, 3.8, 3.9, 4.0, 4.1, 4.2, 4.3, 4.4), preferably between pH 3.6 and pH 3.8. In FIG. 2, the homogenate, in step 22, is mixed with a food grade alkaline such as sodium bicarbonate, sodium carbonate, potassium bicarbonate, potassium carbonate, or sodium hydroxide and the like to increase the pH to one in a range between about 8.3 and about 10.5 (e.g., about 8.4, 8.5, 8.6, 8.7, 8.9, 9.0, 9.1, 9.2, 9.3, 9.4, 9.5, 9.6, 9.7, 9.8, 9.9, 10.0, 10.1, 10.2, 10.3, 10.4). The pH is either lowered or raised to the aforementioned pH range to dissolve or solubilize animal muscle tissue to thereby obtain a satisfactory yield of protein such as 80% (85%, 90%, 95%, 96%, 97%, 98%, 99%, 100%) yield or higher in the solubilized protein solution thereof while retaining the fat portion in solid form. In an embodiment, it is preferred to utilize hydrochloric acid since its use results in more significant reduction of viable microorganisms in the acidic protein solution.

Subjecting the proteins to acid or base under low salt conditions has been shown to unfold the proteins, which is believed to create more surface area along the proteins and hence more potential water binding sites. It is believed that a base will make the protein charges negative (negative-negative repulsion) whereas acid will change the protein charges to positive-positive repulsion.

Once the proteins are solubilized by an acid or a base, the fat renders away from the proteins and floats to the surface of an aqueous solution. Other potential impurities, including any residual bone, skin or sinew, stay insoluble as well. The pH is adjusted to between about 3.6 and 4.4 or to between about 8.3 and about 10.5. As an example, the approximate amount of acid needed to effect solubilization of the muscle proteins is approximately 0.15 to 0.80 weight %, e.g. 0.198 weight % based on the weight of HCl to total weight (pH 3.74). This amount is dependent on the desired low pH (pH 3.6 or 4.4) and also on the pH of the starting material. Similarly, for base, sodium carbonate can be used in a concentration between about 0.7% and about 10% solution, and sodium bicarbonate can be used in a concentration between about 0.5% to about 10% solution (e.g., between about 5 and 6%) with water. Suitable mixers for this step include Lightning Mixers available from SPX Corporation, located in Charlotte, NC or the like.

Solubility can occur with the addition of a food grade acid or a food grade base. As used herein, "solubilized protein" refers to the protein being dissolved in liquid or put into solution. In an embodiment, acid or base is added in a sufficient amount and concentration to allow the protein to dissolve or solubilize without denaturing the protein. Any food grade acid or base can be used to adjust the pH to ranges described herein to solubilize the protein. Examples of food grade acids that can be used for the present invention include citric acid, phosphoric acid, ascorbic acid, hydrochloric acid or a combination thereof. Examples of food grade bases include sodium bicarbonate, sodium carbonate, potassium bicarbonate, potassium carbonate, or sodium hydroxide. Other acids or bases, previously known or later developed, can be used in the steps of the present invention so long as they solubilize the protein under conditions described herein and are food grade.

The volume and concentration of the acid used to solubilize the protein at the desired pH will depend on the starting pH of the solution, and the volume of the solution being brought to the proper pH. The concentration of the food grade acid will depend on the particular acid being used and the composition (e.g., liquid or powder forms) but ranges between about 0.5M to about 3M (e.g., between about 1M and about 2 M) (molarity) or between 0.2% to about 90% w/w % (approximate strength). In the case of citric acid, a concentration of about 2M (e.g., between about 0.5M and about 3M) and in the case of hydrochloric acid, a concentration of 1M (e.g., between 0.2 and about 2M) can be used to solubilize the protein. With respect to phosphoric acid, an 85% strength can be used. In the case of citric acid and phosphoric, about 0.3% and about 1% by weight can be used, and for hydrochloric acid, a range of about 0.2 to about 0.5% by weight can be used with the steps of the present invention. When using ascorbic acid with the methods of the present invention, its powder/crystalline form can be used in which case the ascorbic acid power can be added directly to the homogenate. The choice of the food grade acid and its concentration should be one that does not denature the protein in the homogenate. In an embodiment, to solubilize the protein, the food grade acid adjusts the pH of the homogenate to obtain a resulting pH in the range of equal to or between about 3.6 and about 4.2 (e.g., about 3.6, 3.7, 3.8, 3.9, 4.0, 4.1 and 4.2).

In another embodiment, to solubilize the protein, the food grade base adjusts the pH of the homogenate to obtain a resulting pH in the range of equal to or between about 8.3 and about 10.5 (e.g., about 8.4, 8.5, 8.6, 8.7, 8.9, 9.0, 9.1, 9.2, 9.3, 9.4, 9.5, 9.6, 9.7, 9.8, 9.9, 10.0, 10.1, 10.2, 10.3, 10.4). The volume and concentration of the base used at the desired pH will depend on the starting pH of the solution, and the volume of the solution being brought to the proper pH. The concentration of the food grade base will depend on the particular base being used and the composition (e.g., liquid or powder forms) but ranges between about 0.5M to about 3M (e.g., between about 1M and about 2 M) (molarity) or between 0.2% to about 90% w/w % (approximate strength). In an embodiment, sodium carbonate can be used in a concentration between about 0.7% and about 10% solution, and sodium bicarbonate can be used in a concentration between about 0.5% to about 10% solution (e.g., between about 5 and 6%) with water. Additionally, when using sodium bicarbonate it can be used as a powder added directly to the protein.

In an embodiment, solubilization of the homogenate refers to the protein being mostly solubilized or in solution. In another embodiment, solubilization refers to the solution having at least about 75% (e.g., 80%, 85%, 90%, 95%, 96%, 97%, 98%, 99%, or 100%) of the protein solubilized. Once the protein is solubilized, it is referred to as a "solubilized liquid protein solution."

The resultant mixture of solubilized liquid protein solution and solid fat then is directed to separation step 26 such as a decanter centrifuge and/or screen filter 26 to separate the acidic protein solution from the solid fat.

Subsequent to the solubilization of the proteins and removal of impurities and fat, the proteins are precipitated by bringing the pH to or close to the isoelectric point. In the case in which acid was used to solubilize, precipitation can be performed by the addition of food grade base such as sodium hydroxide (NaOH) or sodium bicarbonate (NaHCO$_3$). In the case in which a base was used to solubilize the protein, precipitation can be accomplished by adding food grade acid, such as citric acid or the like. In an embodiment, precipitation is performed when the pH is brought to a range between about 4.9 and about 6.4 (e.g., 4.9, 5.0, 5.1, 5.2, 5.3, 5.4, 5.5, 5.6, 5.7, 5.8, 5.9, 6.0, 6.1, 6.2, 6.3, 6.4). The isoelectric range can depend, for instance, on conditions such as salt, the type of protein, the charge of the protein, the amino acids that make up the protein, and the ionic strength of the solution to which the protein has been subjected. In an embodiment, the base or acid is added until the isoelectric point is obtained and/or the proteins refold and rejoin with each other to form large, fiberized molecules. Upon reaching the isoelectric point pH, the proteins release their closely aligned water molecules, and the moisture content can be returned to the moisture content found in meat or consistent with FTM or LFTM. Any food grade acid or base can be used to adjust the pH to these ranges and examples and amounts of such acids and bases are provided herein in the solubilization discussion of step 22. The volume and concentration of the acid or base used to obtain the desired pH will depend on the starting pH of the solution, and the volume of the solution being brought to the proper pH. In another embodiment, precipitation refers to the suspension having at least about 75% (e.g., 80%, 85%, 90%, 95%, 96%, 97%, 98%, 99%, or 100%) of the protein precipitated.

The solid fat in step 28 is optionally mixed with a food grade alkali or acid to separate water from fat and to neutralize the fat. Optionally, cold potable water from step 29 can be added to the fat in step 28. The alkali or acid promotes separation of fat from water. The fat then is filtered in step 31 to remove water from fat and reduce the water content from about 70 to 50 weight percent to about 30 to 20 weight percent. Optionally, the fat can be refrigerated or frozen in step 33. Suitable filtration apparatus includes a vibrating screen available from Sweco Corporation, located in Florence, KY or the like. The screens have a size between about 4000 microns and about 2000 microns, preferably between about 3500 microns and about 2500 microns.

Additional base or acid can be added in step 34 to bring the pH of the precipitated proteins back to the original pH of the tissue. This assures that the base (e.g., NaOH or NaHC03) or acid has fully reacted with and consumed all of the previously added acid (e.g., HCL or citric) or base, respectively. An optional step is to direct the protein product to a unit operation 35 which removes water to concentrate the liquid for the purpose of creating larger fibers. The unit operation could consist of any device found to remove water in a continuous or batch manner, such as an evaporator or an ultrafiltration unit. The amount of water removed can vary, however, greater amounts of water removed results in larger and more robust and sturdy fibers and increased protein recovery. The resultant protein product is a viscous sediment containing protein at a concentration of about 4-14 percent by weight or higher to produce a protein containing solution which is directed to mixing step 34 wherein it is mixed with food grade alkaline or acid 36. The protein product is precipitated in step 38 and is recovered such as by centrifugation and filtration in step 40. Optionally, an ultrafiltrate retentate having a >5000-10,000 molecular weight cut off (MWCO) is recovered in step 41. This ultrafiltrate can be blended as desired with the precipitated protein in step 43. This results in a protein product having a reduced sodium content. The sodium is concentrated in the lower molecular weight fraction that is discarded. The resultant product has reduced sodium and is obtained by a process that provides a high yield of protein from the starting poultry feed of about 80% (85%, 90%, 91%, 92%, 93%, 94%, 95%, 96%, 97%, 98%, 99%, 100%) or greater. Thus, the process of this invention, provides a greatly improved protein product over the available prior art.

The protein product from step 40 contains 14 percent or greater by weight protein, contains less than 10 percent by weight fat, is produced at a temperature less than 110° F., can be frozen within 30 minutes in step 42 from process completion, does not allow a significant increase in bacteria and, in the embodiment, the precipitated protein does not retain chemicals or additives other than a low concentration of salt such as sodium chloride or the like.

If a protein powder is desired, one can decide to spray dry the dewatered precipitate or solubilized liquid protein solution. Either the precipitate or the solubilized liquid protein solution can be spray dried to form a protein powder that can be used as a protein powder or added to foods or drinks. Spray drying can be performed by commercially available apparatus, such as a 30-inch Bowen Spray Drying unit machine or a GEA Niro Food Spray Dryer (Soborg, Denmark). Pre-treatment steps may be taken to prevent denaturing of the protein during the spray drying process, and include, for example, adding sodium bicarbonate or other base to the protein precipitate such that the pH equal to or between about 6.5 to about 8.0.

The steps of the present invention include performing vacuum tumbling. Vacuum tumbling pulls water into the mixture uniformly. If vacuum tumbling is desired, it can be performed with the precipitate or the solubilized liquid protein. Vacuum tumbling may last for between about 20 minutes to about 90 minutes. In the case of using the precipitate, water is added to the protein precipitate mixture. In the case of the solubilized liquid protein, it is tumbled with pieces of meat or animal muscle tissue to form a marinated meat product (e.g., marinated chicken or beef). A vacuum tumbler, such as a BIRO Manufacturing Model VTS-500 Vacuum Tumbler, can be used for example. The vacuum tumbling process pulls water into the mixture in a uniform way. The vacuum tumbling step is optional. The resulting protein is a protein marinade.

The meat protein products of this invention are not significantly altered by the processing method of this invention. An examination of the proteins associated with the starting meat source and the lean cold processed meats (precipitated refolded protein) shows that the extraction process is mild enough not to effect changes in the proteins throughout the entire process. It also shows that very little to no hydrolysis has occurred during the processing, partly due to the low temperature. Refolding of the protein also does not affect its profile.

Surprisingly, the process allows the protein product to essentially maintain or retain its original color, as defined herein, and other functional characteristics. In other words, protein that undergoes the steps of the present invention, in one aspect, can still maintain its functional characteristics including its original color.

The resulting protein has a number of characteristics. In another aspect, the product of this invention is capable of meeting the definition of "finely textured meat" (e.g., fat content of less than 30%; a protein content of 14% or greater, by weight) or "lean finely textured meat" (e.g., fat content of less than 10%, a protein content of 14% or greater, by weight) as presently defined by the U.S. government. In an embodiment, the protein product of the present invention has about 14% or greater (e.g., about 15, 16, 17, 18, 19, 20, 21, 22, 23, 24, 25%) by weight protein and less than about 30% (less than about 25%, 20%, 15%, 10%, 9%, 8%, 7%, 6%, 5%, 4%, 3%, 2%, 1%, 0%) by weight fat. In yet another aspect, the protein composition of the present invention also has the functionality of raw meat as measured from a measurement selected from a water binding test, a meat emulsion test, a moisture retention test, a color test/observation, and a combination thereof. In an aspect, the beef protein product of the present invention has a color of 75 to 52 L*, 25 to 15 a* and 23 to 16 b*. For poultry, the animal muscle tissue protein product has a raw meat color of 82 to 45 L*, 7.5 to 2.2 a* and 20 to 3 b*.

Thus, the protein product can be used "as is" or then can be applied to raw meat for sale to consumers without cooking. The methods of the present invention result in a protein product that is a functional meat composition. A "functional" meat composition is one that acts like raw, uncooked meat. Functional meat is defined as a meat composition that acts like raw meat with respect to one or more of the following characteristics: water binding, meat emulsion, moisture retention and/or a color. The present invention includes meat compositions that meet or exceed one or more of these functional meat characteristics.

Water binding ability refers to the ability of the protein product of the present invention to retain and/or uptake moisture and can be tested using the procedure of Hand et al. "A Technique to Measure the Water Uptake Properties of Meat," 77$^{th}$ Annual Meeting of the American Society of Animal Science, Paper No. 202 (1985). Briefly, water binding ability can be determined by adding water to meat, shaking it, and centrifuging it. After centrifugation, the centrifuged meat is placed on a mesh wire screen and then weighed. Meat products that undergo the steps of the present invention have a water binding ability that is the same or greater, as compared to meat that does not undergo the steps of the present invention. In an embodiment, meat products that undergo the steps of the invention have a water binding ability that is about 1% to about 125% greater (e.g., between about 40% and about 60% greater), as compared to meat that does not undergo the steps of the invention.

Meat emulsion, sometimes referred to as fat emulsion, refers generally to the ability for the inventive protein to bind or adhere to itself (e.g., its ability to stick together) and/or to form a protein matrix (e.g., a viscous meat batter). In an instance, the phrase "meat emulsion" refers to the binding ability of protein, fat, water and optionally other types of ingredients normally added to such a mix (e.g., butter, mayonnaise, seasonings, and the like). One can determine if a meat emulsion is formed by observation. It can also be measured in terms of its capacity (e.g., the maximum amount of fat or oil stabilized by a given amount of protein) or stability (the amount of fat or oil retained or separated after stressing with heat the formed emulsion/batter).

Moisture retention refers to amount/content of moisture retained in the protein product at any given time. Moisture retention in a meat product can be determined by using moisture analyzers (e.g., Ohaus MB Model 25) or by observation (e.g., observing the amount of moisture that drips or escapes the meat). Meat products that undergo the steps of the present invention have moisture retention that is also the same or greater, as compared to meat that does not undergo the steps of the present invention. In an aspect, meat products that undergo the steps of the invention have moisture that is about the same or about 1% to about 5% greater (e.g., between about 2% and about 3% greater), as compared to meat that does not undergo the steps of the invention. Moisture retention can be controlled in the dewatering step so that, if desired, moisture retention can be brought down to its original moisture content.

The protein product of the methods of the present invention results in protein product that retains its original or most of its original raw meat color. The protein product of the methods of the present invention results in beef protein product that has a color of about 75 to 52 L*, 25 to 15 a* and 23 to 16 b*, and a poultry protein product that has a color of 82 to 45 L*, 7.5 to 2.2 a* and 20 to 3 b*. The process of the present invention enables the protein product to look and act like raw or functional meat. Color is measured using the CIE L*a*b* color system with dimension L for lightness and a* and b* for the color-opponent dimensions, based on XYZ coordinates. The L*a*b* color space includes all perceivable colors. In practice, the color is mapped using a three-dimensional integer for color representation. The lightness, L*, represents the darkest black and the brightest white, while the a* axis represents opponent colors red and green while the b* axis represents yellow and blue. Color can be measured using a color meter or colorimeter (e.g., CR-10 Plus from Konica Minolta (Ramsey, NJ, USA). The steps of the present invention surprisingly result in a lean meat that has all or most of its original raw meat color, or its color before processing. The red color or raw meat color of the beef protein composition, is defined, in one aspect about 75 to 52 L*(e.g., 75, 74, 73, 72, 71, 70, 69, 68, 67, 66, 65, 64, 63, 62, 61, 60, 59, 58, 57, 56, 55, 54, 53, 52), about 25 to 15 a*(e.g., 25, 24, 23, 22, 21, 20, 19, 18, 17, 16, 15) and about 23 to 16 b* (e.g., 23, 22, 21, 20, 19, 18, 17, 16). The raw meat color of the poultry protein composition, is defined, in one aspect about 82 to 45 L*(e.g., 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45), 7.5 to 2.2 a* (e.g., 7.5, 7.0, 6.5, 6.0, 5.5, 5.0, 4.5, 4.0, 3.5, 3.0, 2.9, 2.8, 2.7, 2.6, 2.5, 2.4, 2.3, 2.2) and about 20 to 3b* (e.g., 20, 19, 18, 17, 16, 15, 14, 13, 12, 11, 10, 9, 8, 7, 6, 5, 4, 3).

Unexpectedly it was found that the appearance of the product of this invention had retained the physical appearance including its color of raw uncooked beef or poultry without the addition of the protein product.

In summary, the process of this invention produces protein in higher yields as compared to the prior art, contains fewer microorganisms as compared to the prior art and is in a form by which it can be more easily mixed with meat as compared to the products of the prior art. In addition, the fat product obtained is stabilized against oxidation.

The following examples illustrate this invention and are not intended to limit the same.

Example 1

Frozen mechanically separated chicken was obtained from a commercial production facility in Georgia. The product was fully thawed at refrigerated temperatures and the thawed meat was mixed with cold water at a 1:4 ratio (meat:water). The mixture was homogenized using a Kitchen Aid hand-held mixer for 2 min at high speed. The homogenate was adjusted to pH 2.8 or 3.6 using hydrochloric acid (2N), The acidified homogenate was filtered through a 1000 micron stainless steel screen. The filtrate was adjusted to pH 5.5 using sodium hydroxide (4N) and filtered through the same washed 1000 micron screen to de-water. Precipitated samples were frozen and sent to Silliker Labs, Chicago Heights, IL for analysis.

TABLE 1

Metal and oxidation values of precipitated Lean Cold Processed Chicken made for pH 2.8 and pH 3.6

| Analyte | Starting MDM | LCPC from pH2.8 | LCPC from pH 3.6 | Procedure |
| --- | --- | --- | --- | --- |
| Calcium (mg/ 1OOg, dry wgt basis) | 7.55 | 4.02 | 3.31 | AOAC 984.27 |
| Sodium (mg/ 1OOg, dry wgt basis) | 3.76 | 4.10 | 3.21 | AOAC 984.27 |
| PeroxySafe Peroxide value (meq/kg) (dry wgt basis) | 0.020 | 0.014 | 0.004 | AOAC R1 03050 |

Processing of mechanically separated poultry through the invention was shown to lower sodium and calcium and overall reduce the amount of oxidation that occurs in the final product compared to the starting material. Processing to pH 3.6 compared to pH 2.8 was shown to result in a great reduction in metals as well as further reduce the amount of oxidation that had occurred. It can be found in the literature that oxidation accelerates at low acidic pH values and therefore could explain in this experiment the oxidation increase as the meat is processed at the lower pH.

Example 2

This example illustrates that recovery of protein from meat trimmings must be effected at a pH of 3.6 or above in order to recover a protein product from satisfactory color. This example also illustrates that initially obtaining protein having an unsatisfactory color cannot be reversibly converted to a protein product having a satisfactory color.

The results obtained in Table 2 were obtained with 40 g samples of ground beef. To each sample was added 160 ml of cold tap water (40° F.). The samples were then homogenized to a particle size of about 100 microns. The pH of each sample was adjusted with 1M food grade hydrochloric acid to a pH set forth in Table 2. Each sample was centrifuged for 8 minutes at 5000 g at 4° C. and then filtered through glass wool to separate solid fat from protein liquid composition. 40 ml of each liquid portion was poured into a container on top of white paper. Each sample was then measured twice with each sample with a Minolta colorimeter that measures L*,a* and b* values as set forth above.

The average L*, a* and b* were then computed as shown in Table 2.

value" was determined using a handheld colorimeter (Precise Color Reader-TO21, China; D65; 10°; SCI; 8 mm) positioning the meter to view the liquid through clear glass. Color values were the average of triplicate readings.

Results:

TABLE 1

Redness "a* values" at varying pH values for acidified, homogenized poultry.

| Protein Type | pH | a* value | Color |
|---|---|---|---|
| Turkey - Control | 6.16 | 2.27 | RED |
| Turkey | 3.96 | 2.34 | |
| Turkey | 3.61 | 2.21 | |
| Turkey | 3.50 | 1.47 | BROWN |
| Turkey | 3.39 | 1.34 | |
| Chicken Thigh - Control | 6.34 | 4.12 | RED |
| Chicken Thigh | 3.91 | 3.97 | |
| Chicken Thigh | 3.62 | 3.87 | |
| Chicken Thigh | 3.49 | 2.13 | BROWN |
| Chicken Thigh | 3.39 | 1.94 | |

Conclusions: As was seen with beef there was a change in the a*-value when the pH transitioned from pH 3.6 to pH 3.5. The amount of citric acid needed to adjust the pH to 3.6 (turkey) was 1.67 g and pH 3.5 was 1.76 g. For chicken thigh, 1.58 g was needed to adjust to pH 3.6 and 1.64 g was

TABLE 2

Color Measurements Ground Beef

| pH | L* (1) | a* (1) | B* (1) | L* (2) | a* (2) | b* (2) | L* (AVG) | a* (AVG) | b* (AVG) |
|---|---|---|---|---|---|---|---|---|---|
| 5.8a | 75.33 | 14.63 | 15.53 | 61.95 | 30.29 | 21.55 | 68.64 | 22.46 | 18.54 |
| 5.8b | 71.40 | 18.35 | 16.59 | 76.92 | 13.93 | 15.31 | 74.16 | 16.14 | 15.95 |
| 5.8 (AVG) | | | | | | | 71.40 | 19.30 | 17.25 |
| 3.8a | 56.92 | 25.11 | 21.01 | 58.77 | 23.53 | 20.80 | 57.85 | 24.32 | 20.91 |
| 3.8b | 55.57 | 26.40 | 21.19 | 59.18 | 23.58 | 20.89 | 57.38 | 24.99 | 21.04 |
| 3.8 (AVG) | | | | | | | 57.61 | 24.66 | 20.97 |
| 3.6 a | 56.01 | 20.38 | 20.46 | 57.35 | 19.46 | 20.54 | 56.68 | 19.92 | 20.50 |
| 3.6b | 57.72 | 21.47 | 20.92 | 58.63 | 20.90 | 20.81 | 58.18 | 21.19 | 20.87 |
| 3.6 (AVG) | | | | | | | 57.43 | 20.55 | 20.68 |
| 3.5a | 58.80 | 15.03 | 20.67 | 61.09 | 13.97 | 20.40 | 59.95 | 14.50 | 20.54 |
| 3.5b | 59.69 | 13.76 | 20.64 | 61.92 | 12.84 | 20.32 | 60.81 | 13.30 | 20.48 |
| 3.5 (AVG) | | | | | | | 60.38 | 13.90 | 20.51 |
| 3.4 a | 57.06 | 14.59 | 20.62 | 61.79 | 12.73 | 20.14 | 59.43 | 13.66 | 20.38 |
| 3.4 b | 57.96 | 14.49 | 20.82 | 60.16 | 13.60 | 20.54 | 59.06 | 14.05 | 20.68 |
| 3.4 (AVG) | | | | | | | 59.24 | 13.85 | 20.53 |
| 3.3a | 61.58 | 12.33 | 20.52 | 65.48 | 10.78 | 19.50 | 63.53 | 11.56 | 20.01 |
| 3.3b | 58.78 | 13.62 | 20.84 | 61.65 | 12.45 | 20.38 | 60.22 | 13.04 | 20.61 |
| 3.3 (AVG) | | | | | | | 61.87 | 12.30 | 20.31 |
| 3.3 to 3.8 a | 57.77 | 19.36 | 20.46 | 59.37 | 18.39 | 20.45 | 58.57 | 18.88 | 20.46 |
| 3.3 to 3.8 b | 57.61 | 16.67 | 20.56 | 57.47 | 16.70 | 20.56 | 57.54 | 16.69 | 20.56 |
| 3.3 to 3.8 (AVG) | | | | | | | 58.06 | 17.78 | 20.51 |

Example 3 Experiment: Color as a Function of pH

Purpose: To examine the redness value (a* of the L*, a*,b*system) in the extraction of protein from turkey and chicken thighs at low pH values.

Materials: Turkey protein was extracted from Plainville Farms, all natural turkey burgers and chicken protein was extracted from Springer Mountain Farms boneless, skinless chicken thighs obtained fresh from the local market.

Procedure: Separately turkey and chicken thigh was ground and placed into cold, spring water at 5.68% (w/w) levels. The mixtures were homogenized using a handheld kitchen stick mixer (Hamilton Beach) for 1.5 minutes. The homogenates were then adjusted to different low pH values using crystalline citric acid. At selected pH values the "a* needed for pH 3.5. Using the L*, a*, b* value system the a* value follows the color change from green (low values) to red (high values). Therefore, the higher the a* value the more "red" in color the item would be. That followed with our experiment as well with a visual transition from "reddish" to "brownish" occurring as the pH went from 3.6 to 3.5.

This data demonstrates that a range of pH values at 3.5 and below, produce a protein composition that is "brown." The samples in the claimed ranges of pH values from 3.6 to 4.4 and the preferred range of 3.6 to 4.0 produce a protein composition having color of raw meat, a more reddish color The color of poultry processed at a pH between 3.6 and 4.0 produced a protein that maintained its "reddish" raw meat color, a color essentially the same as its original color before processing. A significant decrease occurs to the a* value going from pH 3.6 to pH 3.5 which indicates a shift in color from a more reddish color to brownish color. As the a* values become more positive, the more the color is perceived as red. The difference between the value of a* at pH values of 3.6 and 3.5 is 2.21 and 1.47 for turkey and 3.87 and 2.13 for chicken, respectively. This is a significant difference that corresponds to the solutions at those pH values and establishes a clear line between "red" and "brown" colors.

The terms, comprise, include, and/or plural forms of each are open ended and include the listed items and can include additional items that are not listed. The phrase "And/or" is open ended and includes one or more of the listed items and combinations of the listed items.

The relevant teachings of all the references, patents and/or patent applications cited herein are incorporated herein by reference in their entirety.

While this invention has been particularly shown and described with references to preferred embodiments thereof, it will be understood by those skilled in the art that various changes in form and details may be made therein without departing from the scope of the invention encompassed by the appended claims.

What is claimed is:

1. A process for recovering, from deboned poultry containing fat, bone and protein and initial levels of calcium and sodium, a protein composition with a color of about 82 to about 45 L*, about 7.5 to about 2.2 a* and about 20 to about 3b* and reduced levels of calcium and sodium as compared to the initial levels of calcium and sodium and a protein efficiency ratio of 2.5 or higher, and an essential amino acids content of 33% of the total amino acids or higher, wherein the deboned poultry has about 65-85% by weight lean protein, the process comprising the steps of:
   A) comminuting the deboned poultry in water to thereby obtain comminuted poultry,
   B) adjusting the pH of the comminuted poultry of Step A) to solubilize the protein to obtain a solubilized liquid protein solution, wherein said pH adjustment for solubilizing the protein includes the addition of a food grade acid to obtain a pH value in the range between 3.6 and about 4.4 to thereby obtain a solubilized liquid protein solution, wherein calcium remains insoluble,
   C) separating solid fat from solubilized protein in the solubilized liquid protein solution from Step B), wherein calcium is separated together with the solid fat from the solubilized protein to thereby obtain a reduced fat solubilized liquid protein solution,
   D) precipitating the protein from the reduced fat solubilized liquid protein solution of Step C) to obtain a precipitated protein composition to produce a protein composition with a color of about 82 to about 45 L*, about 7.5 to about 2.2 a* and about 20 to about 3b*, wherein the sodium remains soluble in the solution and does not precipitate with the protein;
   wherein the protein composition has reduced levels of calcium and sodium as compared to the initial levels of calcium and sodium, and the protein composition has about 14% or greater by weight protein and less than about 30% by weight fat, wherein the less than about 30% by weight fat is stabilized against oxidation.

2. The process of claim 1, the protein composition has about 14% or greater by weight protein and less than about 10% by weight fat.

3. The process of claim 1, wherein said pH in Step B) is from 3.6 to 3.8.

4. The process of claim 1, wherein Step A) and Step B) are performed simultaneously.

5. The process of claim 1, wherein precipitating the protein from the solubilized liquid protein solution includes bringing the pH to a value in the range of between about 4.9 and about 6.4.

6. The process of claim 5, wherein adjusting the pH of the comminuted poultry of Step A) comprises adding of a food grade acid to obtain a pH value in the range between 3.6 and about 4.4 and the step of precipitating the protein of Step D) includes adding a base to increase the pH to a value in the range of between about 4.9 and about 6.4.

7. The process of claim 5, wherein the step of precipitating the protein of Step D) includes adding a base to increase the pH to a value in the range of between about 4.9 and about 6.4.

8. The process of claim 1, wherein the addition of a food grade acid in Step B) comprises adding a food grade acid selected from the group consisting of: citric acid, phosphoric acid, ascorbic acid, hydrochloric acid and any combination thereof.

9. The process of claim 6, wherein step of precipitating the protein of Step D) includes adding food grade base selected from the group consisting of: solution sodium bicarbonate, sodium carbonate, potassium bicarbonate, potassium carbonate, sodium hydroxide, and any combination thereof.

10. The process of claim 7, wherein step of precipitating the protein of Step D) includes adding a food grade base selected from the group consisting of: solution sodium bicarbonate, sodium carbonate, potassium bicarbonate, potassium carbonate, sodium hydroxide, and any combination thereof.

11. The process of claim 1, further comprising the step of assessing the functionality of the precipitated protein.

12. The process of claim 11, wherein the functionality of the precipitated protein of Step D) is determined from a measurement selected from the group consisting of: water binding test, meat emulsion test, moisture retention test, a color test and a combination thereof.

13. The process of claim 1, further comprising spray-drying the precipitated protein.

14. The process of claim 13, further comprising adding a base to the precipitated protein such that the pH ranges between about 6.5 to about 8.0 and then spray-drying precipitated protein.

15. The process of claim 1, further comprising vacuum tumbling the precipitated protein.

16. The process of claim 1, wherein the deboned poultry is mechanically deboned poultry.

17. A process for recovering, from deboned poultry containing fat, bone and protein and initial levels of calcium and sodium, a protein composition with a color of about 82 to about 45 L*, about 7.5 to about 2.2 a* and about 20 to about 3b*, wherein the deboned poultry has about 65-85% by weight lean protein and a protein efficiency ratio of 2.5 or higher, and an essential amino acids content of 33% of the total amino acids or higher, the process comprising the steps of:
   A) comminuting the deboned poultry in water to thereby obtain comminuted poultry,
   B) adjusting the pH of the comminuted poultry of Step A) to solubilize the protein to obtain a solubilized liquid protein solution, wherein said pH adjustment for solubilizing the protein includes the addition of a food grade acid to obtain a pH value in the range between 3.6 and about 4.4, C) separating solid fat from solubilized protein in the solubilized liquid protein solution from Step B), to thereby obtain a solubilized liquid protein solution, D) precipitating the protein from the solubilized liquid protein solution of Step C) to obtain a precipitated protein, to thereby obtain a protein composition with a color of about 82 to about 45 L*, about 7.5 to about 2.2 a* and about 20 to about 3b*;

wherein the protein composition has about 14% or greater by weight protein and less than about 30% by weight fat.

18. The process of claim 17, wherein in Step B) the calcium remains insoluble and in Step C) the calcium is separated together with the solid fat from the solubilized protein.

19. The process of claim 18, wherein the protein composition has reduced levels of calcium and sodium as compared to the initial levels of calcium and sodium, and the protein and fat are stabilized against oxidation.

20. A protein composition obtained from deboned poultry containing fat, bone and protein and initial levels of calcium and sodium, wherein said protein composition has a color of about 82 to about 45 L*, about 7.5 to about 2.2 a* and about 20 to about 3b* and reduced levels of calcium and sodium as compared to the initial levels of calcium and sodium, wherein the deboned poultry has about 65-85% by weight lean protein and a protein efficiency ratio of 2.5 or higher, and an essential amino acids content of 33% of the total amino acids or higher, the protein composition is obtained from a process comprising the steps of:

A) comminuting the deboned poultry in water to thereby obtain comminuted poultry, B) adjusting the pH of the comminuted poultry of Step A) to solubilize the protein to obtain a solubilized liquid protein solution, wherein said pH adjustment for solubilizing the protein includes the addition of a food grade acid to obtain a pH value in the range between 3.6 and about 4.4, to thereby obtain a solubilized liquid protein solution, wherein calcium remains insoluble, C) separating solid fat from solubilized protein in the solubilized liquid protein solution from Step B), wherein calcium is separated together with the solid fat from the solubilized protein to thereby obtain a reduced fat solubilized liquid protein solution, D) precipitating the protein from the reduced fat solubilized liquid protein solution of Step C) to obtain a precipitated protein, wherein sodium remains soluble and produces a protein composition with a color of about 82 to about 45 L*, about 7.5 to about 2.2 a* and about 20 to about 3b*;

wherein the protein composition has reduced levels of calcium and sodium as compared to the initial levels of calcium and sodium, and the protein composition has about 14% or greater by weight protein and less than about 30% by weight fat, wherein the less than about 30% by weight fat is stabilized against oxidation.

21. The protein composition of claim 20, wherein the protein composition has about 14% or greater by weight protein and less than about 10% by weight fat.

22. A protein composition obtained from deboned poultry containing fat, bone and protein and initial levels of calcium and sodium, wherein said protein composition has a color of about 82 to about 45 L*, about 7.5 to about 2.2 a* and about 20 to about 3b*, and the deboned poultry has about 65-85% by weight lean protein and a protein efficiency ratio of 2.5 or higher, and an essential amino acids content of 33% of the total amino acids or higher, the protein composition is obtained from a process comprising the steps of:

A) comminuting the deboned poultry in water to thereby obtain comminuted poultry, B) adjusting the pH of the comminuted poultry of Step A) to solubilize the protein to obtain a solubilized liquid protein solution, wherein said pH adjustment for solubilizing the protein includes the addition of a food grade acid to obtain a pH value in the range between 3.6 and about 4.4, to thereby obtain a solubilized liquid protein solution, C) separating solid fat from solubilized protein in the solubilized liquid protein solution from Step B), to thereby obtain a solubilized liquid protein solution, D) precipitating the protein from the solubilized liquid protein solution of Step C) to obtain a precipitated protein, to thereby obtain a protein composition with a color of about 82 to about 45 L*, about 7.5 to about 2.2 a* and about 20 to about 3b*, wherein the protein composition has about 14% or greater by weight protein and less than about 30% by weight fat.

\* \* \* \* \*